C. SINTZ.
CLUTCH.
APPLICATION FILED AUG. 14, 1912.

1,108,936.

Patented Sept. 1, 1914.

2 SHEETS—SHEET 1.

Witnesses
Harold C. Van Antwerp
Pearl Cary

Inventor
Claude Sintz
By Luther V. Moulton
Attorney

C. SINTZ.
CLUTCH.
APPLICATION FILED AUG. 14, 1912.

1,108,936.

Patented Sept. 1, 1914.
2 SHEETS—SHEET 2.

Witnesses
Harold O. Van Antwerp
Pearl Cary

Inventor
Claude Sintz

By Luther V. Moulton
Attorney

UNITED STATES PATENT OFFICE.

CLAUDE SINTZ, OF DETROIT, MICHIGAN.

CLUTCH.

1,108,936.  Specification of Letters Patent.  Patented Sept. 1, 1914.

Application filed August 14, 1912. Serial No. 715,060.

*To all whom it may concern:*

Be it known that I, CLAUDE SINTZ, a citizen of the United States of America, residing at Detroit, in the county of Wayne and State of Michigan, have invented certain new and useful Improvements in Clutches; and I do hereby declare the following to be a full, clear, and exact description of the invention, such as will enable others skilled in the art to which it appertains to make and use the same.

Figure 1:
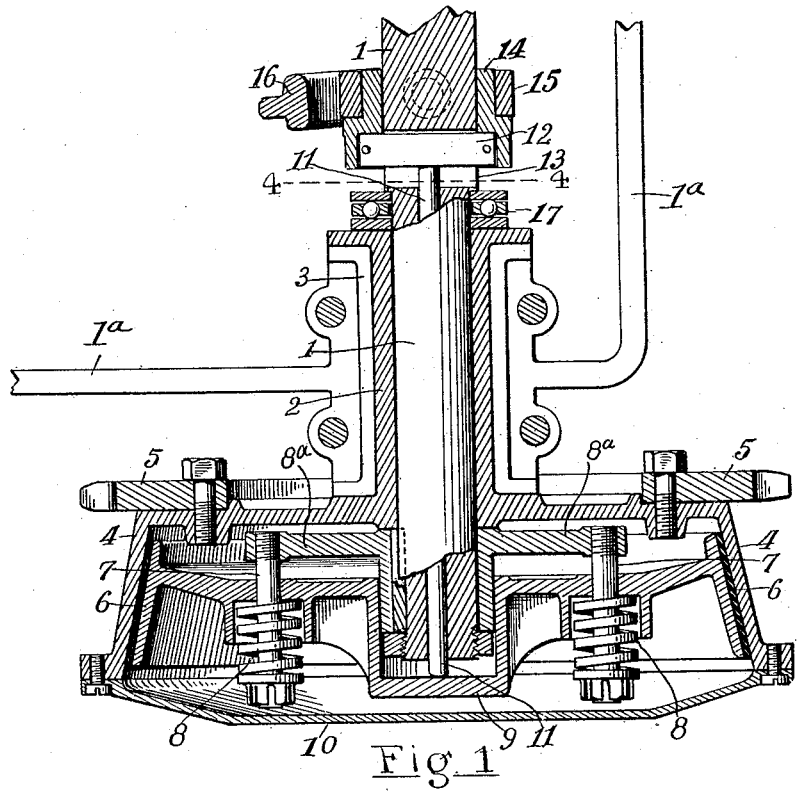
Figure 4:
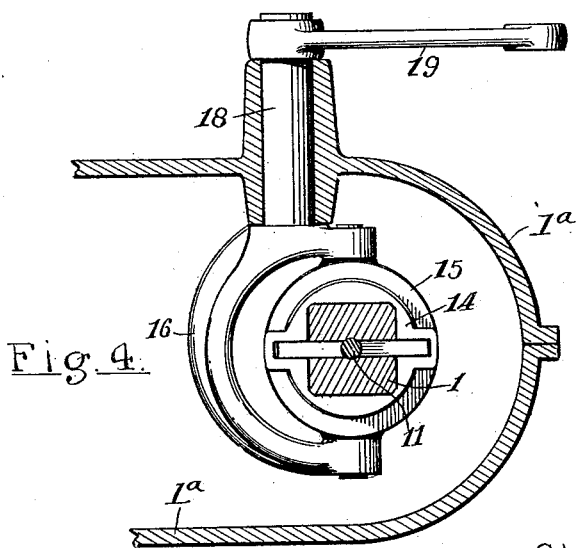
Figure 2:
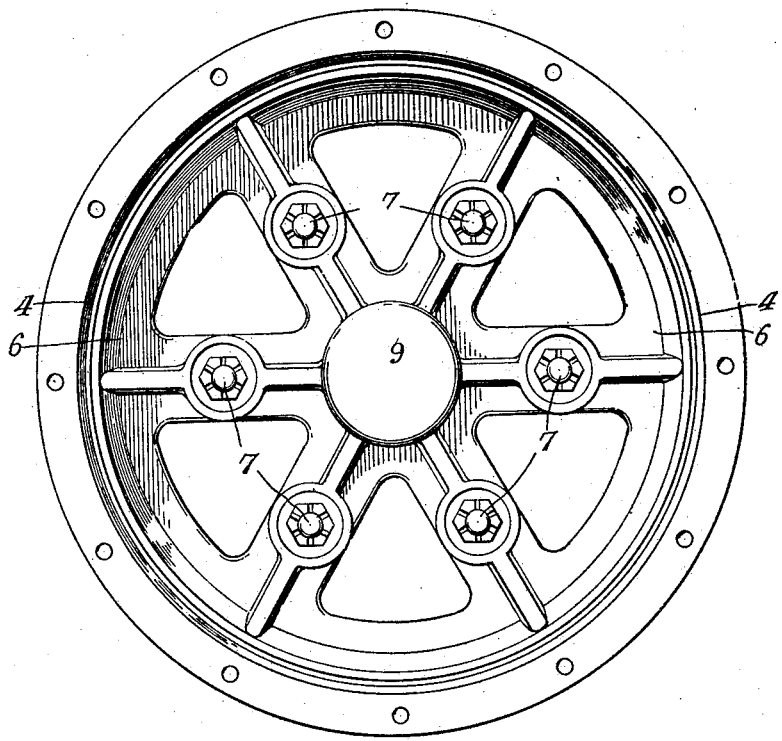
Figure 3:
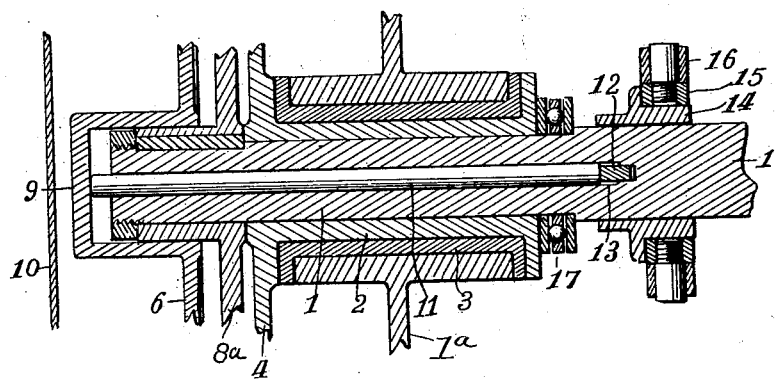

My invention relates to improvements in friction clutches and its object is to provide the same with means whereby the parts of the clutch in frictional contacts for connecting the driving and driven members, are protected from the lubricating material used to lubricate the relatively movable contacting parts; and also to protect the said members from dust or grit; to provide means for inclosing the clutch, and to provide the device with various new and useful features hereinafter more fully described and particularly pointed out in the claims, reference being had to the accompanying drawings in which;

Figure 1 is a horizontal section of a device embodying my invention; Fig. 2 a front elevation of the clutch with the cap removed; Fig. 3 a detail of the device in longitudinal section; and Fig. 4 a detail in transverse section on the line 4—4 of Fig. 1.

Like numbers refer to like parts in all of the figures.

1 represents a tubular shaft in the axis of the device, which in the form shown is a driven member, 2 is a sleeve in which the shaft is rotative, said sleeve also being rotative in a bearing 3 in the wall of the case 1ª, 4 is the outer conical cup shaped clutch member fixed on the outer end of the sleeve 2, and preferably integral with the same, this constitutes the driving member of the clutch in the form of device shown and is preferably driven by a sprocket wheel 5 connected thereto and to any suitable motor. Within this outer conical clutch member is the driven clutch member 6 having its periphery adapted to frictionally engage the interior of the member 4. This member 6 is slidable in the direction of its axis on the hub of a spider 8ª fixed on the outer end of the shaft 1, the hub 9 of the member 6 being closed at the outer end, and engaged by a push rod 11 slidable in the axis of the shaft. Fixed in the arms of the spider are studs or bolts 7 which extend slidably through the member 6 and on which are mounted springs 8 engaging said member whereby it is forced yieldably into contact with the driving member to drive the shaft 1. To disengage the clutch the push rod 11 is operated to compress the springs and move the driven member out of contact with the driving member. To operate this rod a transverse key 12 is provided movable longitudinally of the shaft 1 and attached to a collar 14 having a square opening to receive the squared end of the shaft and slidable on the same, which collar is engaged by a ring 15 in which the collar is rotative, the ring being engaged by a yoke 16 to move the collar on the shaft, the yoke being mounted on a rock shaft 18 journaled in the case and operated by a lever 19 fixed on the outer end thereof and connected to any suitable means for manually operating the same.

17 is a thrust bearing fixed on the shaft and engaging the inner end of the sleeve 2 to take the thrust due to the action of the springs 8 when the clutch is engaged.

To inclose the clutch, and exclude dust and other matter from the same, a cap 10 is provided which closes the outer end of the driving member 4 and incloses the spider and inner member within said driving member.

By the device shown the parts subject to moving contact such as the gears which are driven by the shaft 1, together with the thrust bearing are inclosed within the case, and the clutch is arranged outside the same where it is easy of access and also the lubricating material within the case is excluded therefrom.

What I claim is:

1. A friction clutch, comprising a rotative shaft, a rotative sleeve in which the shaft is journaled, an outer conical clutch member fixed on the sleeve, a spider fixed on the shaft, an inner clutch member movable longitudinally of its axis and movably connected to the spider, a hub on the inner clutch member having one end closed over the end of the shaft, springs to move the inner clutch member into engagement with the outer clutch member, a push rod movable longitudinally in the shaft and engaging the closed end of said hub, and means for manually operating the push rod to disengage the clutch members.

2. A friction clutch, comprising a rotative shaft; a rotative sleeve in which the shaft is journaled, a conical outer clutch member fixed on the sleeve, a spider fixed on the shaft and within the outer clutch member, an inner conical clutch member movably connected to the spider by studs, a hub on said inner clutch member having one end closed over the end of the shaft, springs on the studs to move the inner clutch member into contact with the outer clutch member, a push rod longitudinally movable in the axis of the shaft and engaging the closed end of said hub to disengage the clutch members, a transverse key in the shaft engaging the other end of the rod, a collar slidable on the shaft and attached to the key and means for manually moving the collar.

3. A friction clutch, comprising a case, a sleeve journaled in the wall of the case and extending therethrough, a shaft rotative in the sleeve and extending therethrough, a conical outer clutch member fixed on the outer end of the sleeve, a spider fixed on the outer end of the shaft, studs fixed in the spider, an inner clutch member slidable on the studs, springs on the studs to move the inner clutch member into contact with the outer clutch member, a push rod longitudinally movable in the axis of the shaft and engaging the outer clutch member oppositely to the springs, a transverse key in the shaft within the case to engage the inner end of the rod, a collar slidable on the shaft and engaging the key and means within the case and extending outside thereof for manually moving the collar on the shaft.

4. A friction clutch, comprising a case, a sleeve journaled in the wall of the case and extending therethrough, an outer conical clutch member carried on the outer end of the sleeve, a shaft rotative in the sleeve, an inner conical clutch member connected to the shaft and movable longitudinally thereof, a push rod extending within the shaft to operate the clutch, and means for manually operating the push rod extending through the wall of the case and, connected to the push rod within the case.

In testimony whereof I affix my signature in presence of two witnesses.

CLAUDE SINTZ.

Witnesses:
HAROLD O. VAN ANTWERP,
LUTHER V. MOULTON.

---

Copies of this patent may be obtained for five cents each, by addressing the "Commissioner of Patents, Washington, D. C."